United States Patent
Kraft

(10) Patent No.: US 7,373,275 B2
(45) Date of Patent: May 13, 2008

(54) SYSTEM AND METHOD OF POINT MATCHING MEASURED POSITIONS TO TEMPLATE POSITIONS

(75) Inventor: Raymond H. Kraft, Seattle, WA (US)

(73) Assignee: Rudolph Technologies, Inc., Flanders, NJ (US)

( * ) Notice: Subject to any disclaimer, the term of this patent is extended or adjusted under 35 U.S.C. 154(b) by 0 days.

(21) Appl. No.: 10/800,421

(22) Filed: Mar. 12, 2004

(65) Prior Publication Data
US 2004/0225472 A1    Nov. 11, 2004

Related U.S. Application Data

(60) Provisional application No. 60/454,541, filed on Mar. 14, 2003.

(51) Int. Cl.
*G06F 17/18*    (2006.01)
*G06K 9/32*    (2006.01)

(52) U.S. Cl. .................... 702/179; 702/94; 702/95; 382/293; 382/294; 382/209

(58) Field of Classification Search ............... 702/94, 702/95; 382/209, 294, 293
See application file for complete search history.

(56) References Cited

U.S. PATENT DOCUMENTS 5,946,425 A * 8/1999 Bove et al. .............. 382/294
6,067,373 A * 5/2000 Ishida et al. ............. 382/130
6,414,477 B1* 7/2002 Strom .................... 324/158.1

FOREIGN PATENT DOCUMENTS

EP    1061381 A2    12/2000

OTHER PUBLICATIONS

Wang, Y.; Lawrence H. Staib; "Physical Model-based non-rigid registration incorproating statistical shape nformation" Medical Image Analysis, vol. 4, No. 1, 2000, pp. 7-20.
Besl, Paul J., and Neil D. McKay, "A method for registration of 3-D shapes" IEEE Transactions on Patterns Analysis and Machine Intelligence, IEEE Inc., New York, U.S., vol. 14, No. 2, Feb. 1, 1992, 0pp. 239-256.
Rangarajan, Anand, Hali Chui and Eric Mjolsness, "A new distance for non-rigid image matching" 1999, Berlin, Germany, pp. 237-252.
Cachier, Pascal, and Xavier Pennec "3D Non-Rigid Registration by Gradient Descent on a Gaussian-Windowed Similarity Measure Using Convolutions" IEEE Comput. Soc. U.S.A., Jun. 2000, pp. 182-189.

* cited by examiner

*Primary Examiner*—Eliseo Ramos-Feliciano
*Assistant Examiner*—Janet L Suglo
(74) *Attorney, Agent, or Firm*—Pillsbury Winthrop Shaw Pittman LLP

(57) ABSTRACT

A system and method of point matching measured positions to template, or reference, positions for various applications may generally comprise creating force field vectors and moments operative to perturb measured point locations into alignment with template point locations. Progressive reduction of the force radius may produce results that match very well for points that are highly correlated with the template pattern.

35 Claims, 13 Drawing Sheets

✗ Measured Point

◯ Template Point

Major Iteration Loop 4

SYSTEM AND METHOD OF POINT MATCHING MEASURED POSITIONS TO TEMPLATE POSITIONS

CROSS-REFERENCE TO RELATED APPLICATIONS

The present application claims the benefit of U.S. provisional application Ser. No. 60/454,541, filed Mar. 14, 2003, entitled "A METHOD OF FAST, ROBUST, RIGID POINT MATCHING OF PROBES TO TEMPLATE POSITIONS," the disclosure of which is hereby incorporated herein by reference in its entirety.

FIELD OF THE INVENTION

Aspects of the present invention relate generally to the field of matching sets of points between a measured set and a template set, and more particularly to a system and method providing fast, robust, rigid point matching of measured positions to template positions.

BACKGROUND OF THE INVENTION

Matching sets of points between a measured set and a template set is a common problem in astronomy, biomedical imaging, animation, precision instrument testing and calibration, and other technologies. One such technology is probe card analysis, in which planarity and alignment of a plurality of probes arranged in an array may be tested or calibrated through comparison with a known location of one or more fiducial marks, for example, disposed on or integrated into the structure of a fiducial plate. In particular, some probe card analysis systems employ optical or image data acquired by a camera or other imaging apparatus; in some cases, the imaging apparatus may be disposed on the opposite side of a substantially transparent fiducial plate from the probe array associated with the probe card. These acquired data are representative of both probe tips and fiducial marks, and data processing may be employed which seek to identify position and orientation of probe tips relative to each other through comparison with the known position and orientation of one or more fiducial marks. Alternatively, the position and orientation of imaged probe tips may be compared to ideal position and orientation data maintained in the template or reference data set.

In the case of a probe card analysis system, image data representing the probe tips may generally be considered "measured" data or points; in some applications, the "template" data may represent ideal or reference points (derived, for example, from the design specifications of the probe card or an industry standard) independent of imaged fiducial marks. Similarly, many of the foregoing technologies, among others, employ comparative metrology relying upon measured data sets and template, or reference, data sets; in many instances, point matching techniques are employed in an attempt to match data representing non-ideal measured points (which include errors, missing points, and erroneous points) to data representing known ideal, template, or reference points. In practice, one example of an application in which point matching techniques may have utility is in comparing an image acquired by a telescope to known locations of celestial objects as recorded on a star chart. While some data processing components attempt point matching operations to fit the measured points to a known reference frame, currently implemented systems and methods are deficient in that traditional methodologies do not accommodate fast, robust, rigid point matching of measured positions to template positions in an integrated and elegant solution.

SUMMARY

Aspects of the present invention overcome the foregoing and other shortcomings of conventional technology, providing a system and method of point matching measured positions to template, or reference, positions for various applications. Exemplary systems and methods may generally comprise creating force field vectors and moments which are operative to perturb measured point locations into alignment with template point locations. Progressive reduction of the force radius may produce results that match very well for points that are highly correlated with the template pattern.

In accordance with some embodiments, for example, a method of point matching measured points to template points comprises: acquiring measured data representing a set of measured point locations; comparing the set of measured point locations to template data representing a set of template point locations; defining force field vectors operative to perturb the measured point locations into alignment with the template point locations; and responsive to the defining, matching measured point locations to template point locations.

Depending upon the application or particular system requirements, the matching may comprise utilizing a many-on-many point matching algorithm or a one-to-one point matching algorithm. A method employing one such algorithm may additionally comprise determining offsets, rotations, and position errors between the measured point locations and the template point locations.

In some implementations, the defining may comprise creating the force field vectors to act over a prescribed range. In one the creating may comprise, for distances greater than the prescribed range, dissipating a magnitude of the force field vectors with increasing distance; additionally, the creating may comprise, for distances shorter than the prescribed range, increasing a magnitude of the force field vectors with increasing distance.

Some methods of point matching measured points to template points may further comprise selectively repeating the comparing, the defining, and the matching operations set forth above; additionally, the selectively repeating may comprise selectively decrementing the prescribed range at each successive iteration of the defining.

In accordance with another aspect of the subject matter described herein, a computer readable medium encoded with data and instructions for point matching measured points to expected points may cause an apparatus executing the instructions to: acquire measured data representing a set of measured point locations; compare the set of measured point locations to reference data representing a set of expected point locations; define force field vectors and moment arms operative to perturb the measured point locations into alignment with the expected point locations; and selectively repeat, until predetermined convergence criteria have been satisfied: comparing, to the reference data, the measured point locations perturbed by the force field vectors and the moment arms; and redefining the force field vectors and the moment arms responsive to the comparing.

In some applications, such a computer readable medium may further cause an apparatus executing the instructions to compare the set of measured point locations to the set of expected point locations utilizing a many-on-many or a one-to-one point matching algorithm. Such instructions may further cause an apparatus to determine offsets, rotations, and position errors between the measured point locations and the expected point locations.

As set forth above, the force field vectors may be created to act over a prescribed range; in that regard, a computer readable medium may further cause an apparatus executing the instructions to decrement the prescribed range at each successive iteration of the redefining.

In accordance with the principles set forth in detail below, an exemplary method of measuring probe locations in a probe card analyzer system may comprise: acquiring measured data representing a set of probe point locations; comparing the set of probe point locations to reference data representing a set of expected point locations; responsive to the comparing, defining force field vectors and moment arms operative to perturb the probe point locations into alignment with the expected point locations; and selectively repeating: computing modified probe point locations representative of the probe point locations perturbed by the force field vectors and the moment arms; and redefining the force field vectors and the moment arms responsive to the computing; until predetermined convergence criteria have been satisfied. The acquiring may comprise utilizing an imaging apparatus.

The computing may comprise determining offsets, rotations, and position errors between the probe point locations and the expected point locations. A method of measuring probe locations in a probe card analyzer system is contemplated wherein the defining and the redefining comprise creating the force field vectors to act over a prescribed range; in some applications, the redefining comprises decrementing the prescribed range at each successive iteration of the redefining.

The foregoing and other aspects of the disclosed embodiments will be more fully understood through examination of the following detailed description thereof in conjunction with the drawing figures.

DETAILED DESCRIPTION

By way of background, it is noted that the exemplary algorithm set forth below may provide or enable a fast, robust method for performing rigid point matching between measured and template data sets, and for determining the rigid transformation required to bring the two sets into best alignment. In that regard, an exemplary point matching strategy matches measured locations of points to expected locations of points. The exemplary algorithm is robust to outliers and missing or extra data in the measured data set, and may generally perform a many-on-many point matching operation where the correspondence between points is unknown. In accordance with some simplified embodiments, an exemplary algorithm may also be modified to perform one-to-one point matching when a one-to-one point correspondence is known. Those of skill in the art will appreciate that other algorithmic approaches or recursive computational procedures may provide similar functionality and may readily be implemented in accordance with the principles described herein. The present disclosure is not intended to be limited to any particular equation or set of equations having utility in achieving the desired results.

The point matching functionality set forth herein may employ both measured data sets and template, or reference, data sets. Specifically, a system and method configured and operative in accordance with the present disclosure match data representing possibly non-ideal, measured points (i.e., "measured" data may include errors, missing points, and erroneous points) to data representing known ideal points. In that regard, the terms "template," "ideal," and "reference" as used herein are generally intended to refer to a set of known or given data points against which "measured" or acquired data points are measured; in this context, it will be appreciated that the term "template" is not necessarily intended to connote physical structure (such as a fiducial plate or a printed star chart, for example), although it may in some applications.

Figure 1:
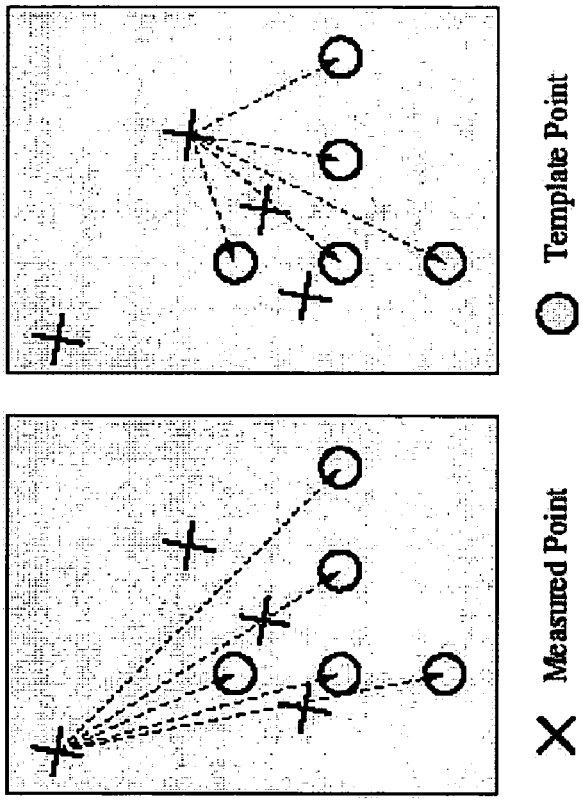
FIG. 1 is a simplified diagram depicting one embodiment of a general case force field definition and illustrating active forces for two measured points.
Figure 3:
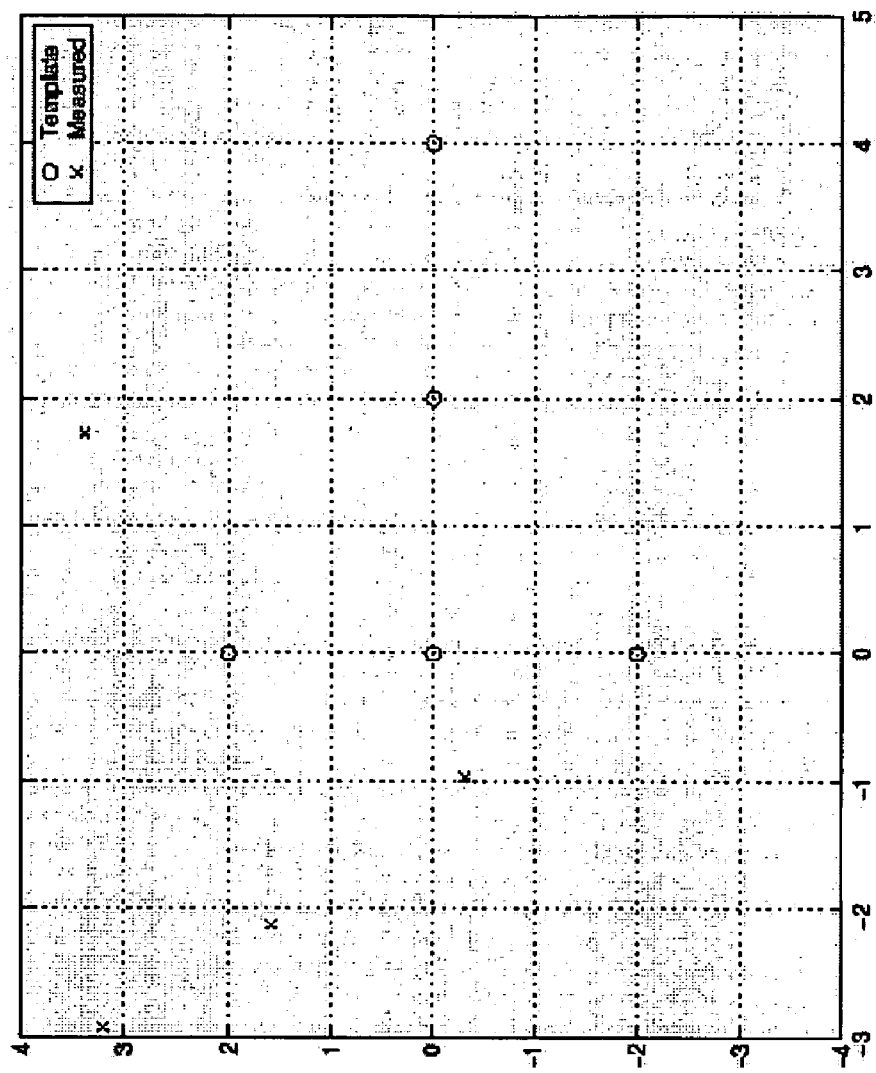
FIGS. 3-8 illustrate results achieved by one embodiment of a point matching method and respectively depict measured points becoming progressively more aligned with template points at the conclusion of successive major iteration loops.
Figure 4:
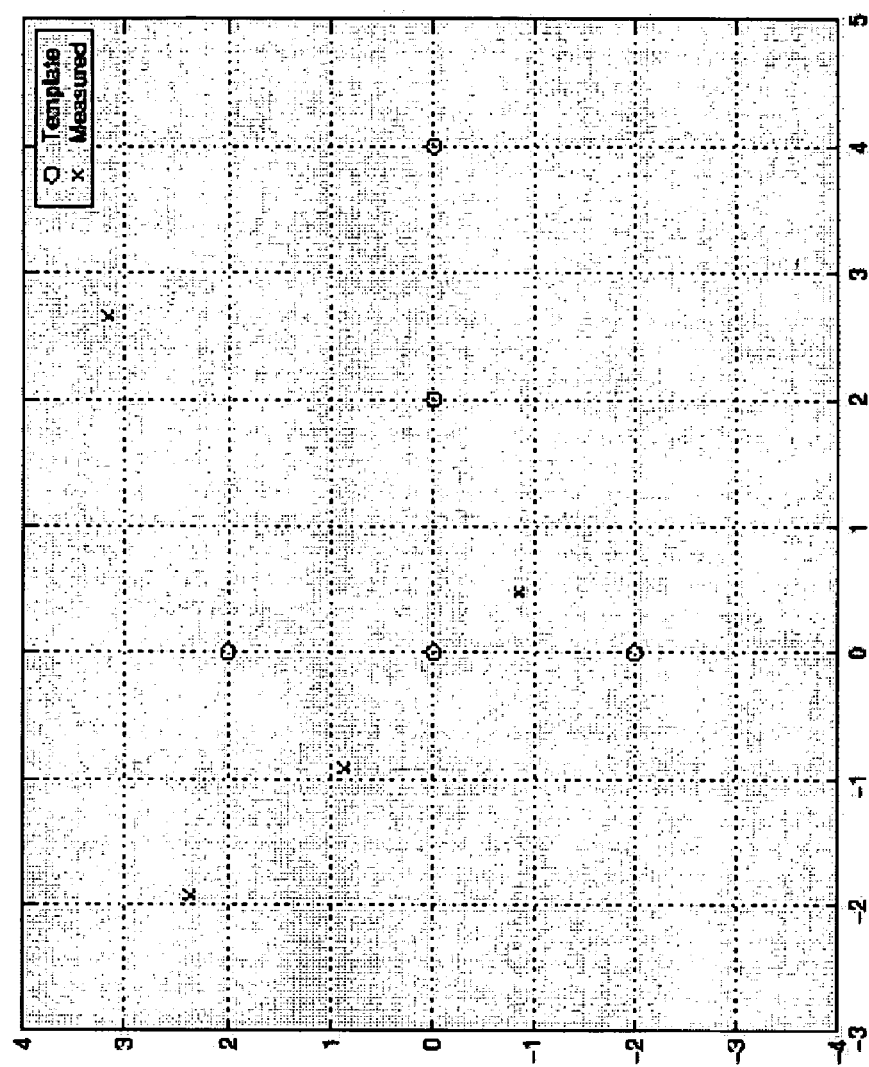
Figure 5:
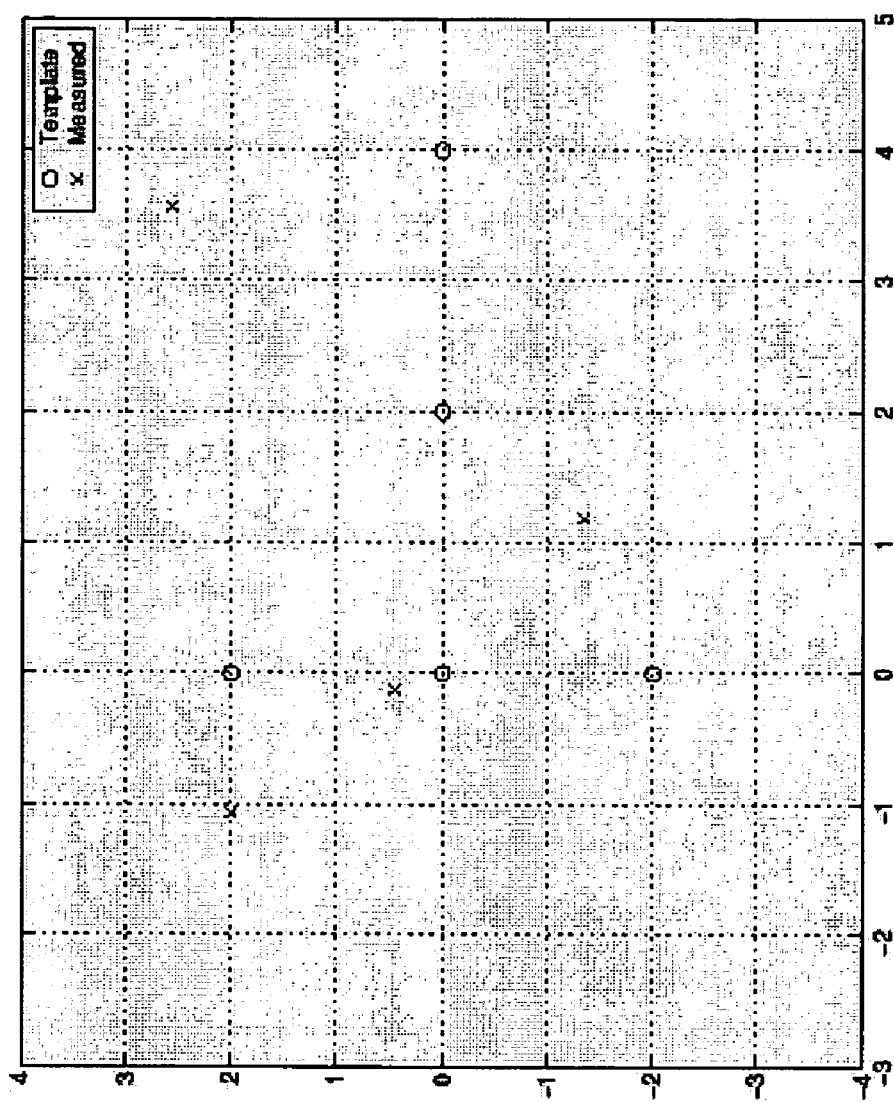
Figure 6:
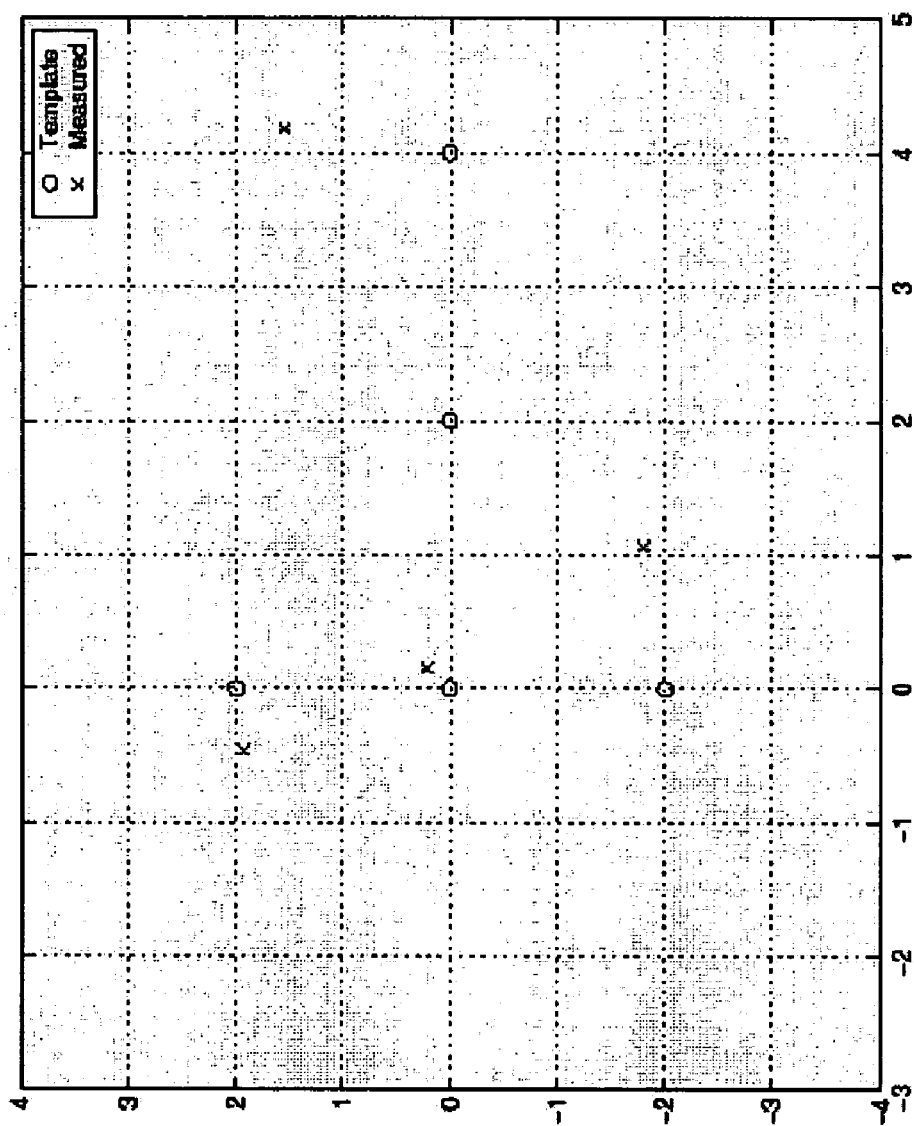
Figure 7:
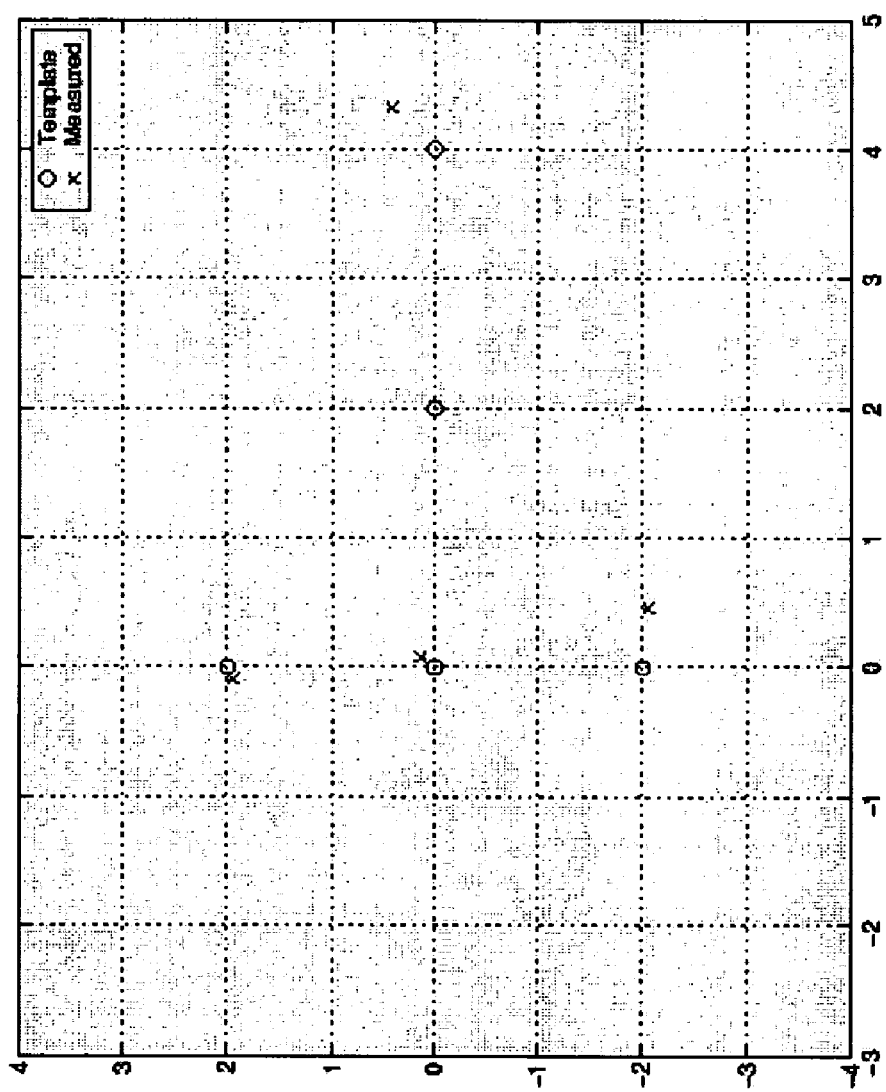
Figure 8:
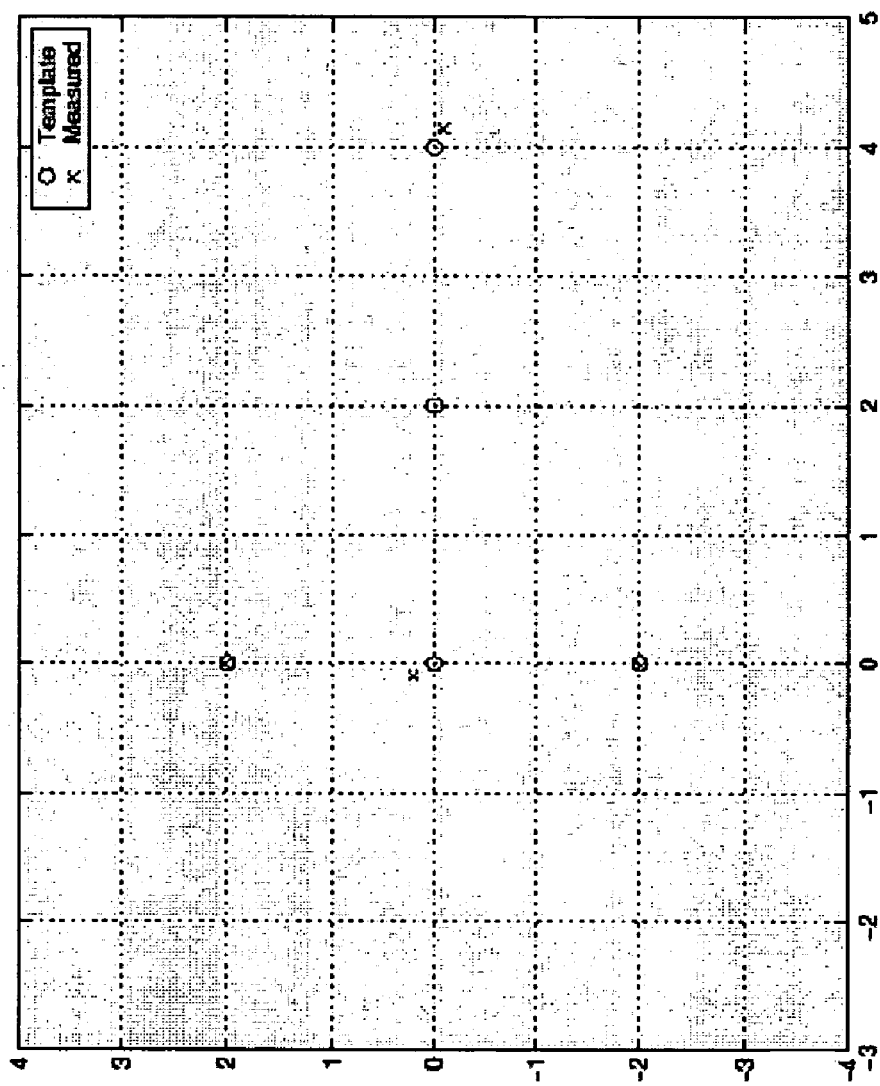
Figure 9:
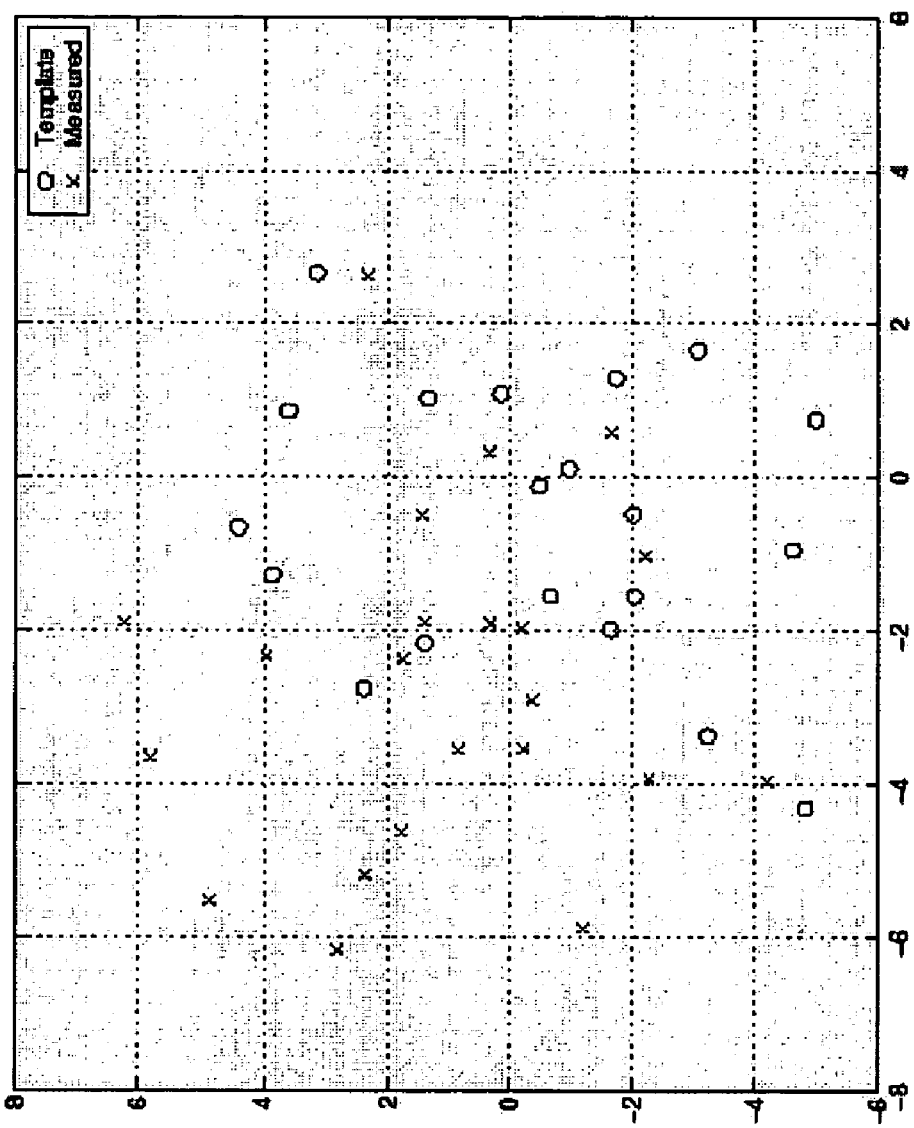
FIGS. 9-14 illustrate results achieved by one embodiment of a point matching method and respectively depict measured points becoming progressively more aligned with template points at the conclusion of successive major iteration loops.
Figure 10:
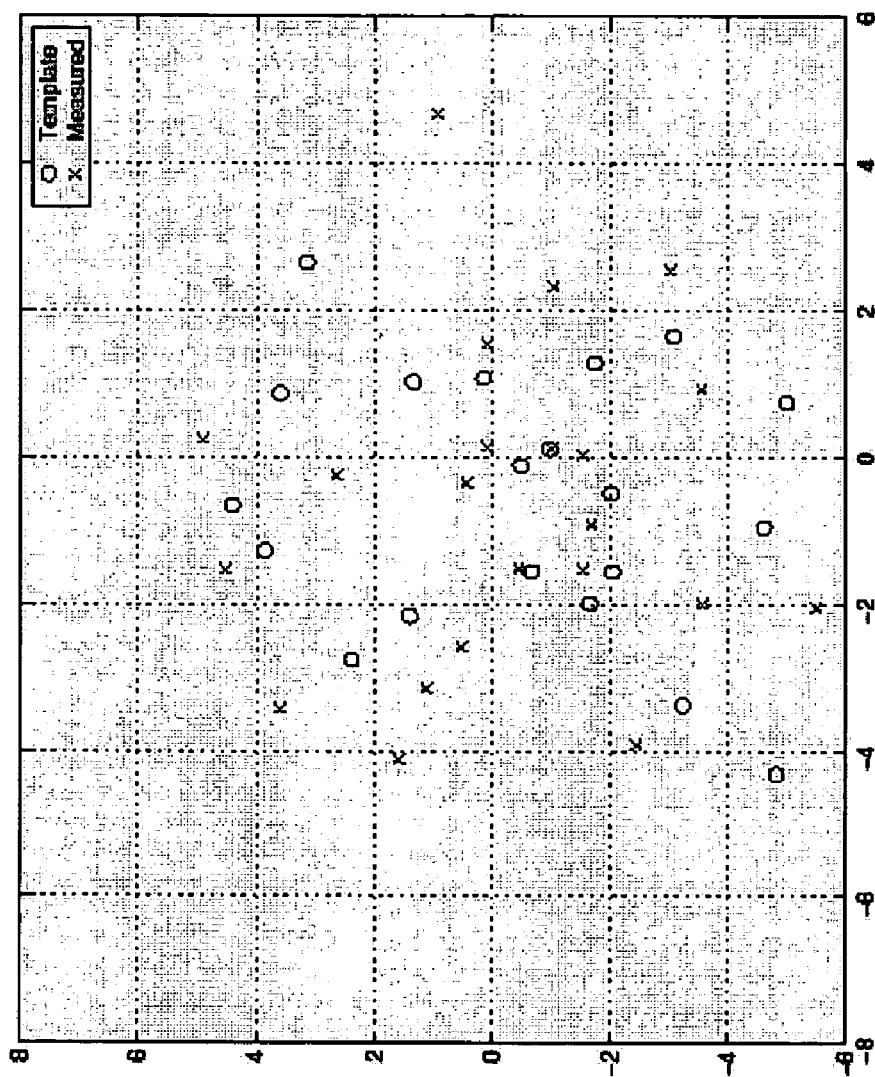
Figure 11:
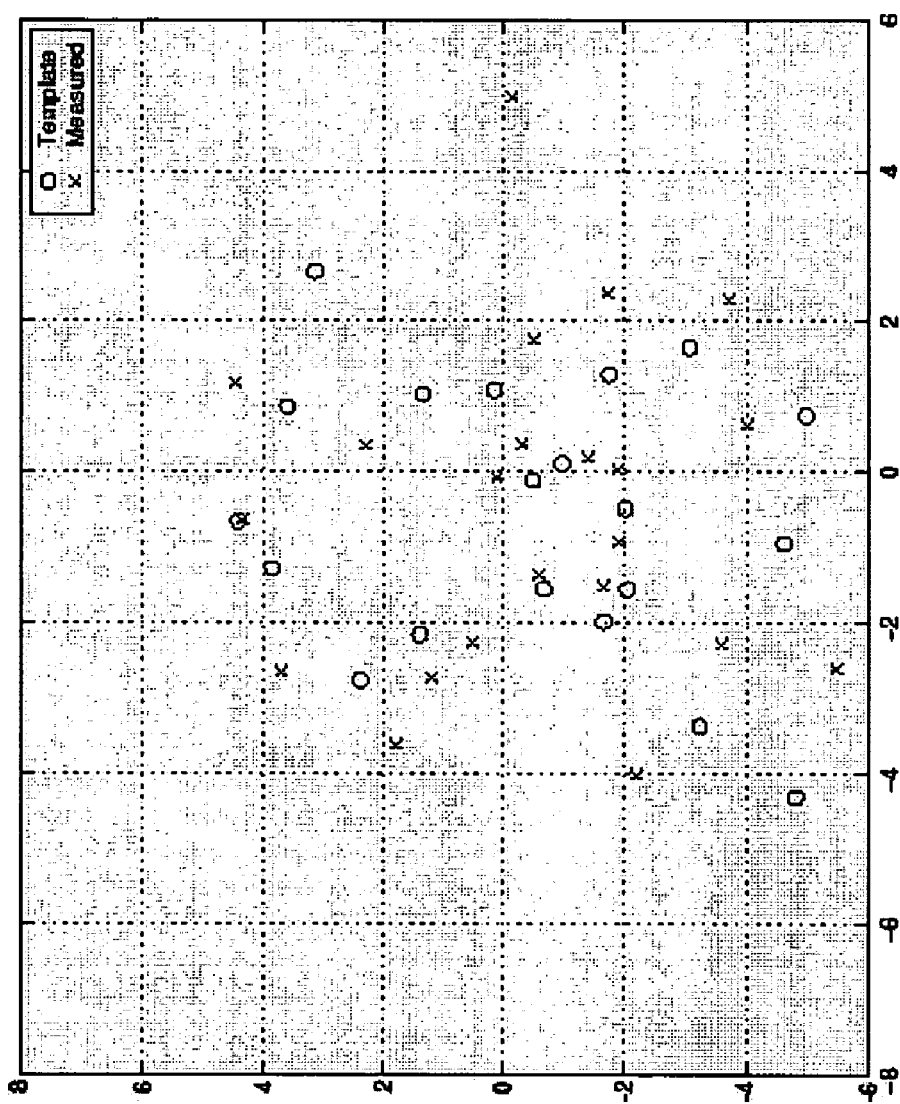
Figure 12:
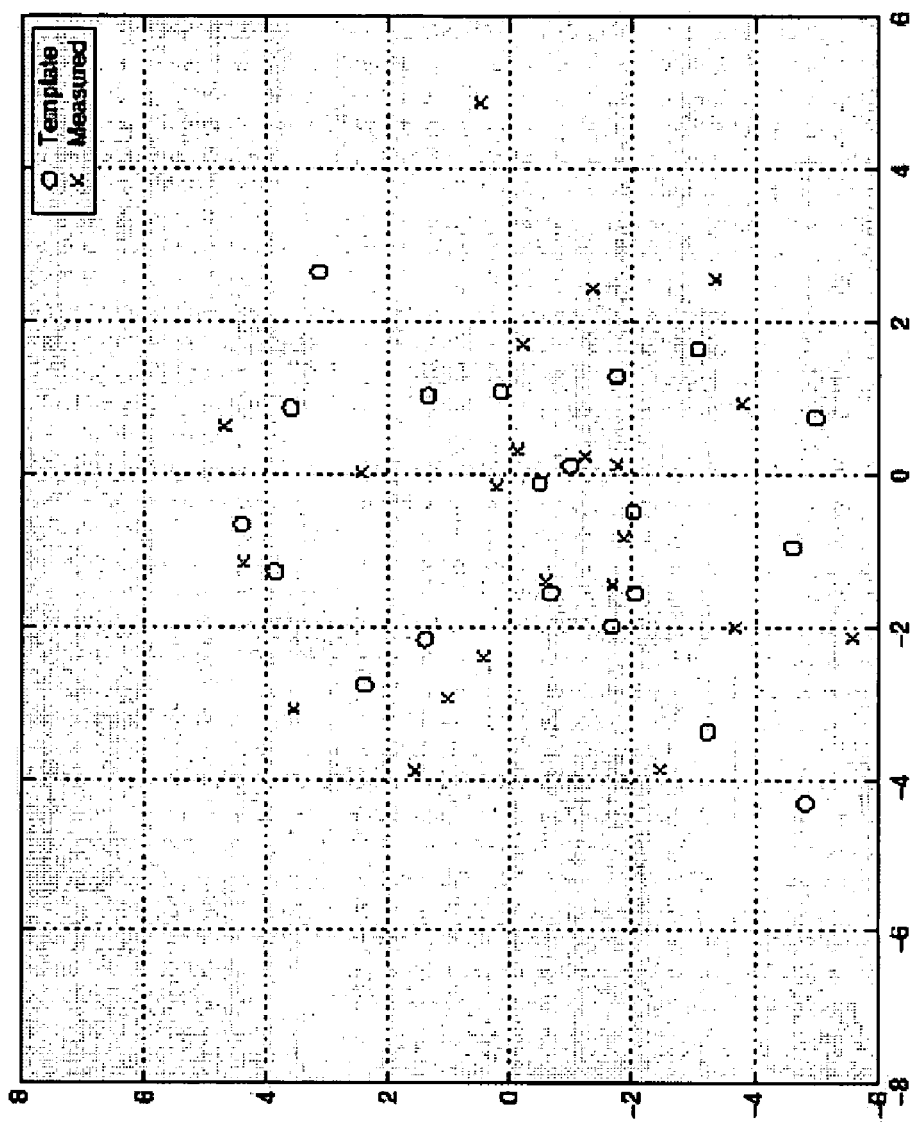
Figure 13:
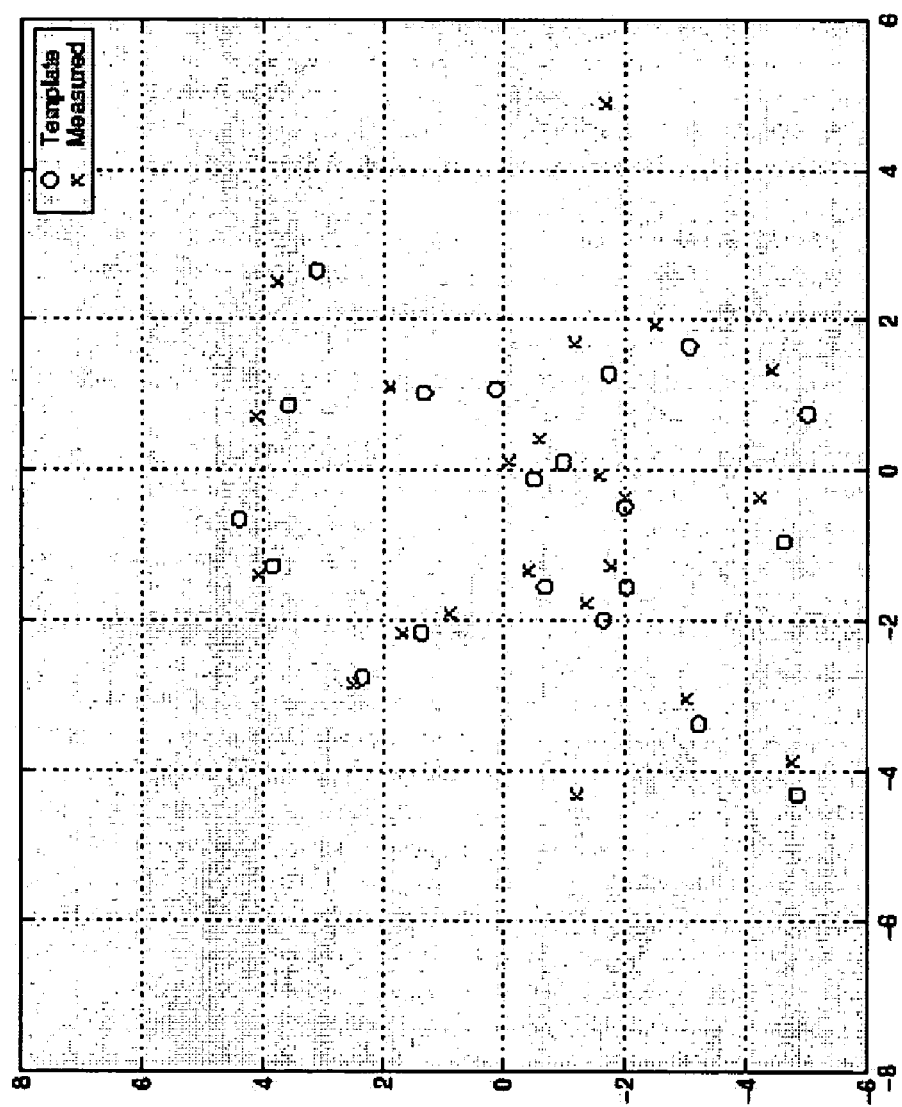
Figure 14:
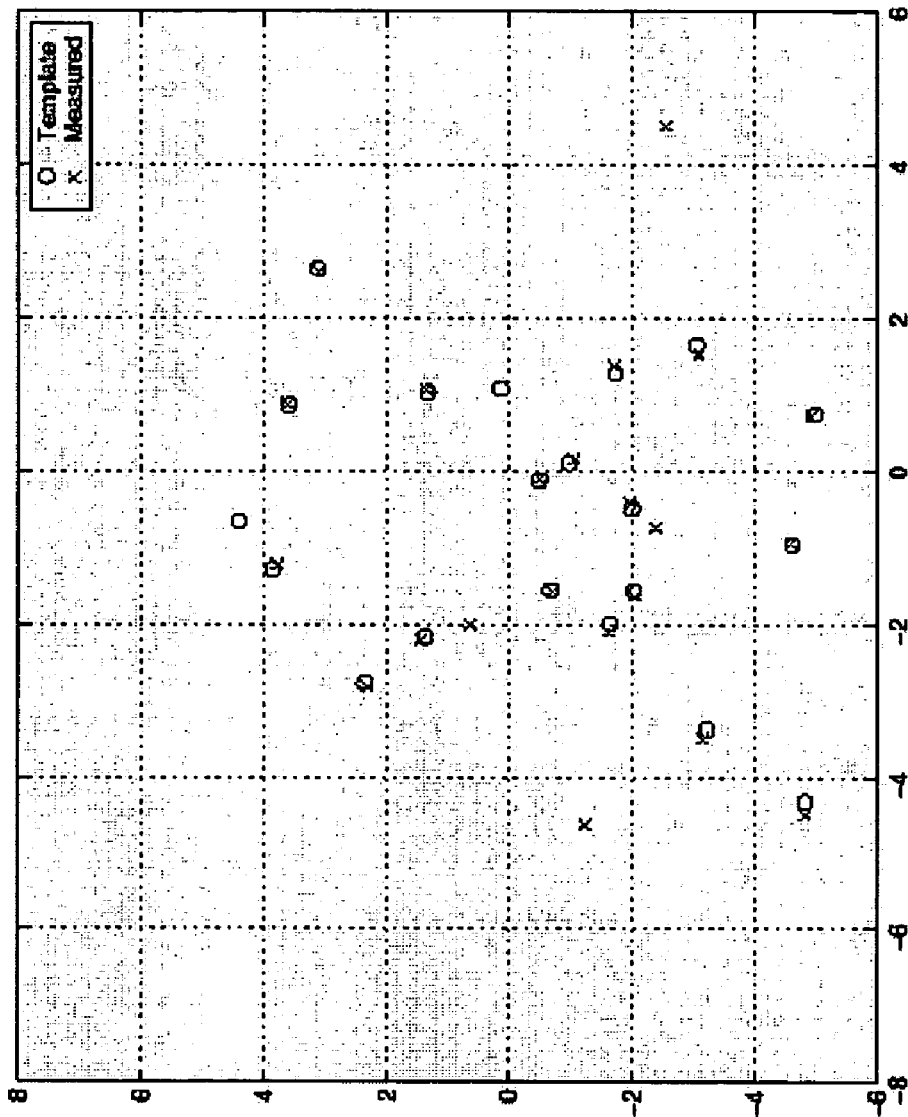

As set forth in more detail below, an heuristic approach operative in accordance with the present disclosure may create an artificial, non-linear, attractive "force field" between all possible point pairs in the general case. FIG. 1 is a simplified diagram depicting one embodiment of a general case force field definition and illustrating active forces for two measured points. As represented in FIG. 1, the "O" symbols denote template points which are fixed, and the "X" symbols denote measured points sought to be brought into optimal alignment with the template points. In accordance with one aspect of the present invention, each measured point "X" may be considered to be drawn, or "perturbed," toward all template points by the force field. In addition to overall translation and rotation, errors in the placement of the measured points may also exist. Such errors may be introduced, for example, by resolution characteristics, acquisition techniques, or other limitations associated with the imaging apparatus or other hardware employed to acquire the measured data set. Additionally, FIG. 1 illustrates a condition in which a point is missing from the measured data set, i.e., in the exemplary FIG. 1 embodiment, only four measured points are present, whereas five points are present in the template set.

Figure 2:
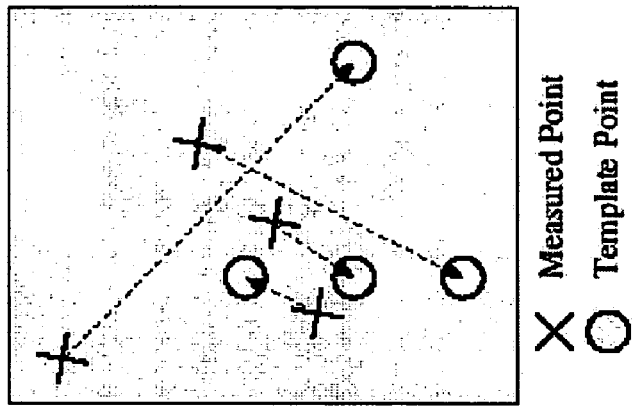
FIG. 2 is a simplified diagram illustrating one embodiment of a special case force field involving a one-to-one point matching scenario.

In practice, the one-to-one matching situation may represent a special case; such a special one-to-one point matching case may utilize what are referred to herein as "attractive forces" only between corresponding points, as generally illustrated in FIG. 2. In particular, FIG. 2 is a simplified diagram illustrating one embodiment of a special case force field involving a one-to-one point matching scenario. In the FIG. 2 embodiment, a known one-to-one correspondence exists between template points and measured points, i.e., each respective measured point is known to correspond to a respective template point.

When summed, resultant attractive forces and moments (embodiments of which are defined by way of example below) may be used to bring the measured point set into alignment with the template point set. The force field vectors (e.g., represented by the dashed arrows in FIG. 2) may be created to act over a prescribed range, r. For distances greater than r, the attractive forces may be designed to dissipate with increasing distance; for distances less than r, however, the attractive forces may be designed to increase with increasing distance. In accordance with some embodiments, the foregoing force field properties may allow an algorithm such as set forth herein, or a similar data processing technique, robustly to handle, model, or otherwise to accommodate outlying, missing, or extra data points, while tightly matching points with high correlation between data sets.

In some instances, the solution process may be configured and operative iteratively to apply rigid shift and rotation to the measured point set in the direction of the overall forces and moments. In that regard, an exemplary solution process may initially create or model a force field having a large range of influence, and may additionally execute iterations until the measured and template point centroids and principle axes align. The range of influence of such a modeled force field may then be made progressively smaller so as to fit points with high correlation between sets even more tightly.

In accordance with some exemplary embodiments, the algorithm described herein may be a general algorithm for points in n-space. Without loss of generality, however, and for the sake of clarity, the following description generally makes reference to the two-dimensional case, i.e., wherein n=2.

Many-on-Many Point Matching

It will be appreciated that a given template set may comprise a set of points having coordinates $(x_{ti}, y_{ti})$, where $(i=1, 2, \ldots, n_{pt})$. Similarly, a measured point set may generally comprise points having coordinates $(x_{mj}, y_{mj})$, where $(j=1, 2, \ldots, n_{pm})$. For the set of measured points, an exemplary algorithm may calculate a centroid $(\bar{x}_m, \bar{y}_m)$, a mean central radius, $r_m$, and a radius of gyration, $\rho_m$, for example, in accordance with the following relationships:

$$\bar{x}_m = \frac{1}{n_{p_m}} \sum_{j=1}^{n_{p_m}} x_{m_j} \tag{1}$$

$$\bar{y}_m = \frac{1}{n_{p_m}} \sum_{j=1}^{n_{p_m}} y_{m_j} \tag{2}$$

$$\bar{r}_m = \frac{1}{n_{p_m}} \sum_{j=1}^{n_{p_m}} \sqrt{(x_{m_j} - \bar{x}_m)^2 + (y_{m_j} - \bar{y}_m)^2} \tag{3}$$

$$\rho_m = \sqrt{\frac{1}{n_{p_m}} \sum_{j=1}^{n_{p_m}} (x_{m_j} - \bar{x}_m)^2 + (y_{m_j} - \bar{y}_m)^2} \tag{4}$$

In one embodiment, the variables $w_{bb}$ and $h_{bb}$ may define a width and height, respectively, of a bounding box of the set of measured points. The maximum range of influence of the force field, also referred to as the maximum force radius, in this case may then be defined as $$r_{f_{max}} = \min\left(\frac{1}{2}\max(w_{bb}, h_{bb}), r_{f_{limit}}\right) \tag{5}$$

where $r_{f_{limit}}$ is a user prescribed (or otherwise preselected or predetermined) limit on the maximum allowable range of influence. The range of influence may then be progressively reined in or incrementally diminished (i.e., selectively decremented) over major iteration steps from an initial value, $r_{f_{max}}$, to a final value, $r_{f_{min}}$. If the variable $k_r$ defines the reduction factor in the force field range of influence from one major iteration loop to the next, then the number of force radius reductions required to reach $r_{f_{min}}$ may be expressed as:

$$n_r = int\left(\frac{\log\left(\frac{r_{f_{max}}}{r_{f_{min}}}\right)}{\log k_r}\right) + 1 \tag{6}$$

Exemplary Force Field Definition

Where the current major iteration step index is denoted by a variable, m, the force radius at this current major iteration step may then be set in accordance with Equation (7) set forth below.

$$r_f = \frac{f_{r_{max}}}{k_r^m}. \tag{7}$$

Between every point, i, in the template set and every point, j, in the measured set, normalized distance vector components between these points may be expressed as follows:

$$d_{x_{ij}} \triangleq \frac{x_{t_i} - x_{m_j}}{r_f} \tag{8}$$

$$d_{y_{ij}} \triangleq \frac{y_{t_i} - y_{m_j}}{r_f} \tag{9}$$

It is noted that the foregoing distance vector components are normalized by the force radius $r_f$. This normalization has the effect of allowing distances shorter than the force radius to produce normalized distances of less than one, and allowing distances longer than the force radius to produce normalized distances greater than one. As set forth briefly above, such normalization may provide the force field with properties and characteristics useful for handling outlying and missing points from the measured point data set. The normalized distance between points i and j may then be described as indicated in Equation (10).

$$r_{ij} \triangleq \sqrt{d_{x_{ij}} + d_{y_{ij}}}. \tag{10}$$

It is also convenient to define moment arms for each point-to-point force vector. In an exemplary implementation, each force vector represents the force applied to a particular measured data point and has a moment arm which may be computed about the centroid of the measured point array (i.e., all the points in the measured data set). In accordance with this embodiment, $$l_{x_j} \triangleq \frac{x_{m_j} - \bar{x}_m}{r_f} \quad (11)$$

$$l_{y_j} \triangleq \frac{y_{m_j} - \bar{y}_m}{r_f} \quad (12)$$

The normalized point-to-point force vector components of the force on measured point j exerted by template point i may then be defined as follows:

$$f_{x_{ij}} \triangleq \frac{d_{x_{ij}}}{(1 + r_{ij}^2)^2} \quad (13)$$

$$f_{y_{ij}} \triangleq \frac{d_{y_{ij}}}{(1 + r_{ij}^2)^2} \quad (14)$$

$$m_{ij} \triangleq l_{x_j} f_{y_{ij}} - l_{y_j} f_{x_{ij}} \quad (15)$$

For normalized distances that are large compared to one, the force vector components diminish quickly as $1/r^3$, allowing robust rejection of missing data points or outliers. For normalized distances that are small compared to one, the force vector components become linearly increasing with increasing distance, enabling smooth convergence properties as the pattern match process progresses to a final solution.

In some embodiments, the foregoing point-to-point forces may be aggregated into an overall average force and moment applied to the measured point cluster.

$$\bar{F}_x = \frac{1}{n_{p_t} n_{p_m}} \sum_{i=1}^{n_{p_t}} \sum_{j=1}^{n_{p_m}} f_{x_{ij}} \quad (16)$$

$$\bar{F}_y = \frac{1}{n_{p_t} n_{p_m}} \sum_{i=1}^{n_{p_t}} \sum_{j=1}^{n_{p_m}} f_{y_{ij}} \quad (17)$$

$$\bar{M} = \frac{1}{n_{p_t} n_{p_m}} \sum_{i=1}^{n_{p_t}} \sum_{j=1}^{n_{p_m}} m_{ij} \quad (18)$$

Iterative Solution Process

At each minor iteration step, aggregate forces $F_x$, $F_y$, and M may be calculated, for example, as set forth above or in a similar manner. In this context, the essence of a "minor" iteration step is to perturb the measured point cluster in the direction of the applied forces with the aim of eventually bringing the measured points making up the cluster into optimal alignment with the template points. Translation and rotation perturbations about the centroid of the measured point array may be expressed as follows $$\delta_x = k_x \bar{F}_x \quad (19)$$

$$\delta_y = k_y \bar{F}_y \quad (20)$$

$$\delta_\theta = k_\theta \bar{M} \quad (21)$$

where $k_x$, $k_y$, and $k_\theta$ represent the convergence gains. These gains may be selected to provide rapid, stable convergence, and may be application or implementation specific. In one embodiment, optimal gain selection may be as expressed in Equations (22) through (24).

$$k_x = r_f \quad (22)$$

$$k_y = r_f \quad (23)$$

$$k_\theta = \left(\frac{r_f}{\rho_m}\right)^2 \quad (24)$$

This minor iteration loop may be selectively repeated, or may automatically continue, for example, either until a convergence criterion (or more than one convergence criteria) has been satisfied, or until a predetermined or preselected number of iterations have been performed. One exemplary convergence criterion may be defined as the final prescribed force radius:

$$t \triangleq r_{f'_{\min}} \quad (25)$$

In some embodiments, the test for convergence may be satisfied if all of the following conditions are met.

$$\delta_x < t \quad (26)$$

$$\delta_y < t \quad (27)$$

$$\delta_\theta \bar{r}_m < t \quad (28)$$

Once convergence has been achieved, or following a maximum number of iterations, the minor iteration loop set forth above may terminate, and the next major iteration loop may begin. In this context, a "major" iteration loop may function progressively to reduce the force radius as set forth above. As the force radius decreases, the solution becomes more attuned to matching measured points that align most closely with the template. At the completion of the defined major iteration loops, i.e., a predetermined or preselected number of major iteration loop operations, the measured point set may be optimally aligned with the template point set.

FIGS. 3-8 illustrate results achieved by one embodiment of a point matching method and respectively depict measured points becoming progressively more aligned with template points at the conclusion of successive major iteration loops. Similarly, FIGS. 9-14 illustrate results achieved by one embodiment of a point matching method and respectively depict measured points becoming progressively more aligned with template points at the conclusion of successive major iteration loops.

Results of the iterative process depicted in FIGS. 3-8 are representative of a simple case involving five template points, and four measured points (such as the situation depicted in FIG. 1, for example). Results of the iterative process depicted in FIGS. 9-14, on the other hand, are representative of a more complicated point matching example. As the progressive results indicate in FIGS. 8 and 14, the measured points may include errors which prevent them from perfectly aligning with the template points; some possible sources of such errors are addressed above with specific reference to FIG. 1. Note that in both examples, however, the effect of progressive reduction of the force radius may produce results that match very well for points that are highly correlated with the template pattern—there is little evidence of trading large errors on low correlation points with small errors on high correlation points.

One-to-One Point Matching

In accordance with one variation of the general algorithm set forth above, knowledge of correspondence between measured data points and template data points may be assumed. In such a case, the attractive force field may be set up only between corresponding points in the template data set and the measured data set. This simplification greatly reduces the computational complexity of the algorithmic approach ($O(n^2) \rightarrow O(n)$), and consequently allows a solution to converge more quickly than in the general case where correspondence is unknown or assumed not to exist.

The preliminary calculations described in Equations (1) through (6) may remain unchanged for a one-to-one variation of the algorithm. The force definition parameters in Equations (7) through (15) may be modified for one-to-one point matching by setting i=j. Then the total average force between the two data sets may be expressed as follows:

$$\overline{F}'_x = \frac{1}{n_{pt}} \sum_{i=1}^{n_{pt}} fx_{ii} \quad (29)$$

$$\overline{F}'_y = \frac{1}{n_{pt}} \sum_{i=1}^{n_{pt}} fy_{ii} \quad (30)$$

$$\overline{M}' = \frac{1}{n_{pt}} \sum_{i=1}^{n_{pt}} m_{ii} \quad (31)$$

The iterative solution process may proceed substantially as set forth above with reference to the many-on-many point matching scheme.

Those of skill in the art will appreciate that the presence of unique, non-repeating features may affect identification of a global optimum solution. If such unique features are not present, a point matching algorithm such as described herein may converge to a local minimum. The stronger the presence of unique features, the more likely the algorithm is to identify a global optimum.

Aspects of the present invention have been illustrated and described in detail with reference to particular embodiments by way of example only, and not by way of limitation. It will be appreciated that various modifications and alterations may be made to the exemplary embodiments without departing from the scope and contemplation of the present disclosure. It is intended, therefore, that the invention be considered as limited only by the scope of the appended claims

What is claimed is:

1. A method comprising:
   acquiring measured data representing a set of measured point locations;
   comparing said measured data to template data representing a set of template point locations;
   defining force field vectors operative to rigidly perturb said measured point locations into alignment with said template point locations based on said comparing; and
   calibrating said set of measured point locations to said set of template point locations based on said force field vectors, wherein
   the step of defining force field vectors includes generating a model of force fields, and wherein the step of comparing includes manipulating said model to obtain a desired fit between said measured point locations and said template point locations.

2. The method of claim 1 wherein said comparing comprises utilizing a many-on-many point matching algorithm.

3. The method of claim 2 wherein said utilizing comprises determining offsets, rotations, and position errors between said measured point locations and said template point locations.

4. The method of claim 1 wherein said comparing comprises utilizing a one-to-one point matching algorithm.

5. The method of claim 4 wherein said utilizing comprises determining offsets, rotations, and position errors between said measured point locations and said template point locations.

6. The method of claim 1 wherein said defining comprises creating said force field vectors to act over a prescribed range.

7. The method of claim 6 wherein said creating comprises, for distances greater than said prescribed range, dissipating a magnitude of said force field vectors with increasing distance.

8. The method of claim 6 wherein said creating comprises, for distances shorter than said prescribed range, increasing a magnitude of said force field vectors with increasing distance.

9. The method of claim 6 further comprising selectively repeating said comparing, said defining, and said calibrating.

10. The method of claim 9 wherein said selectively repeating comprises selectively decrementing said prescribed range at each successive iteration of said defining.

11. The method of claim 1 wherein said set of template point includes fiducial marks.

12. The method of claim 1 wherein said set of measured point locations includes measured locations of probe tips.

13. A computer readable medium encoded with data and instructions for rigid point matching measured points to expected points; said data and said instructions causing an apparatus executing said instructions to:
    acquire measured data representing a set of measured point locations;
    compare said set of measured point locations to reference data representing a set of expected point locations;
    generate a model comprising a plurality of force field vectors and moment arms calculated to rigidly perturb said measured point locations into alignment with said expected point locations; and
    manipulate said model by selectively repeating:
    comparing, to said reference data, said measured point locations perturbed by said force field vectors and said moment arms; and
    redefining said force field vectors and said moment arms responsive to said comparing;
    until predetermined convergence criteria have been satisfied, whereby upon satisfying said convergence criteria, said measured point locations are calibrated to said expected point locations.

14. The computer readable medium of claim 13 further encoded with data and instructions; said data and said instructions further causing an apparatus executing said instructions to compare said set of measured point locations to said set of expected point locations utilizing a many-on-many point matching algorithm.

15. The computer readable medium of claim 14 further encoded with data and instructions; said data and said instructions further causing an apparatus executing said instructions to determine offsets, rotations, and position errors between said measured point locations and said expected point locations.

16. The computer readable medium of claim 13 further encoded with data and instructions; said data and said instructions further causing an apparatus executing said instructions to compare said set of measured point locations to said set of expected point locations utilizing a one-to-one point matching algorithm.

17. The computer readable medium of claim 16 further encoded with data and instructions; said data and said instructions further causing an apparatus executing said instructions to determine offsets, rotations, and position errors between said measured point locations and said expected point locations.

18. The computer readable medium of claim 13 further encoded with data and instructions; said data and said instructions further causing an apparatus executing said instructions to create said force field vectors to act over a prescribed range.

19. The computer readable medium of claim 18 further encoded with data and instructions; said data and said instructions further causing an apparatus executing said instructions to decrement said prescribed range at each successive iteration of said redefining.

20. A method of measuring probe locations in a probe card analyzer system; said method comprising:
   acquiring measured data representing a set of probe point locations;
   comparing said set of probe point locations to reference data representing a set of expected point locations;
   responsive to said comparing, generating a model comprising a plurality of force field vectors and moment arms operative to rigidly perturb said probe point locations into alignment with said expected point locations; and
   manipulating said model by selectively repeating:
      computing modified probe point locations representative of said probe point locations perturbed by said force field vectors and said moment arms; and
      redefining said force field vectors and said moment arms responsive to said computing;
   until predetermined convergence criteria have been satisfied, whereby upon satisfying said convergence criteria, said measured point locations are calibrated to said expected point locations.

21. The method of claim 20 wherein said acquiring comprises utilizing an imaging apparatus.

22. The method of claim 20 wherein said computing comprises determining offsets, rotations, and position errors between said probe point locations and said expected point locations.

23. The method of claim 20 wherein said defining and said redefining comprise creating said force field vectors to act over a prescribed range.

24. The method of claim 23 wherein said redefining comprises decrementing said prescribed range at each successive iteration of said redefining.

25. A method of rigid point matching, the method comprising:
   generating a force field model, including the steps of
      modeling force field vectors based on a comparison of a set of measured point locations to a set of template point locations,
      generating a set of perturbed point locations by rigidly perturbing the measured point locations into alignment with the template point locations using the force field vectors, and
   iteratively repeating the steps of generating and providing to obtain a desired correlation between the set of perturbed point locations and the set of template point locations wherein, a prescribed range of influence over which each modeled force field vector acts is reduced for each iteration, whereby upon obtaining the desired correlation, the measured point locations are calibrated to the template point locations.

26. The method of claim 25 and further comprising providing a set of matched point locations by matching selected ones of the set of perturbed point locations to corresponding ones of the set of template point locations, wherein the matching selected ones to corresponding ones includes determining offsets, rotations, and position errors between the selected ones and corresponding ones.

27. The method of claim 25 wherein magnitude of the each force field vector is dissipated with increasing distance for distances greater than the prescribed range.

28. A calibration method comprising:
   acquiring measured data representing a set of measured point locations;
   comparing said set of measured point locations to template data representing a set of template point locations;
   defining force field vectors operative to rigidly perturb said measured point locations into alignment with said template point locations; and
   responsive to said defining, calibrating the set of measured point locations to the set of template point locations, wherein
   the step of defining force field vectors includes generating a model of force fields, wherein the step of matching includes manipulating said model to obtain a desired fit between said measured point locations and said template point locations.

29. A method of calibrating a semiconductor probe card comprising a plurality of probes, the method comprising:
   acquiring measured data representing measured locations of the tips of the plurality of probes;
   comparing the measured data to template data, the template data indicating desired locations of the tips of the plurality of probes;
   defining force field vectors calculated to rigidly perturb the tips of the plurality of probes into alignment with the desired locations;
   adjusting the measured data in accordance with an application of the force field vectors;
   redefining the force field vectors based on a comparison of the adjusted measured data to the template data; and
   optionally and selectively repeating the steps of adjusting and redefining to obtain a calibration of the plurality of probes.

30. The method of claim 29, wherein the comparing includes:
   identifying position and orientation of the plurality of probe tips relative to one another; and
   matching the identified positions and orientations with corresponding positions and orientations of one or more of the desired locations to obtain the calibration.

31. The method of claim 29, wherein the template data includes fiducial data derived from fiducial marks are provided on a fiducial plate.

32. A method of testing alignment of a plurality of semiconductor probes comprising:

acquiring measured data representing locations of the tips of the plurality of probes;

comparing the measured data to template data, the template data indicating desired locations of the tips of the plurality of probes;

defining force field vectors calculated to rigidly perturb the tips of the plurality of probes into alignment with the desired locations; and adjusting the measured data in accordance with the application of the force field vectors to obtain a fit between the measured data the template data; and for each of the plurality of probes, determining deviation of the position and orientation of a tip of the each probe from position and orientation of corresponding desired locations.

33. The method of claim 32, and further comprising iteratively repeating the steps of comparing, defining and adjusting to obtain an optimal fit between the measured data the template point locations.

34. The method of claim 32, wherein the plurality of probe tips are arranged in an array on a probe card.

35. The method of claim 32, wherein the template data includes fiducial data derived from a set of fiducial marks disposed into the structure of a fiducial plate.

* * * * *